May 23, 1939.    R. BEARSS ET AL    2,159,419
ELECTRICAL SIGNAL OPERATING DEVICE
Filed Nov. 7, 1936    2 Sheets-Sheet 2

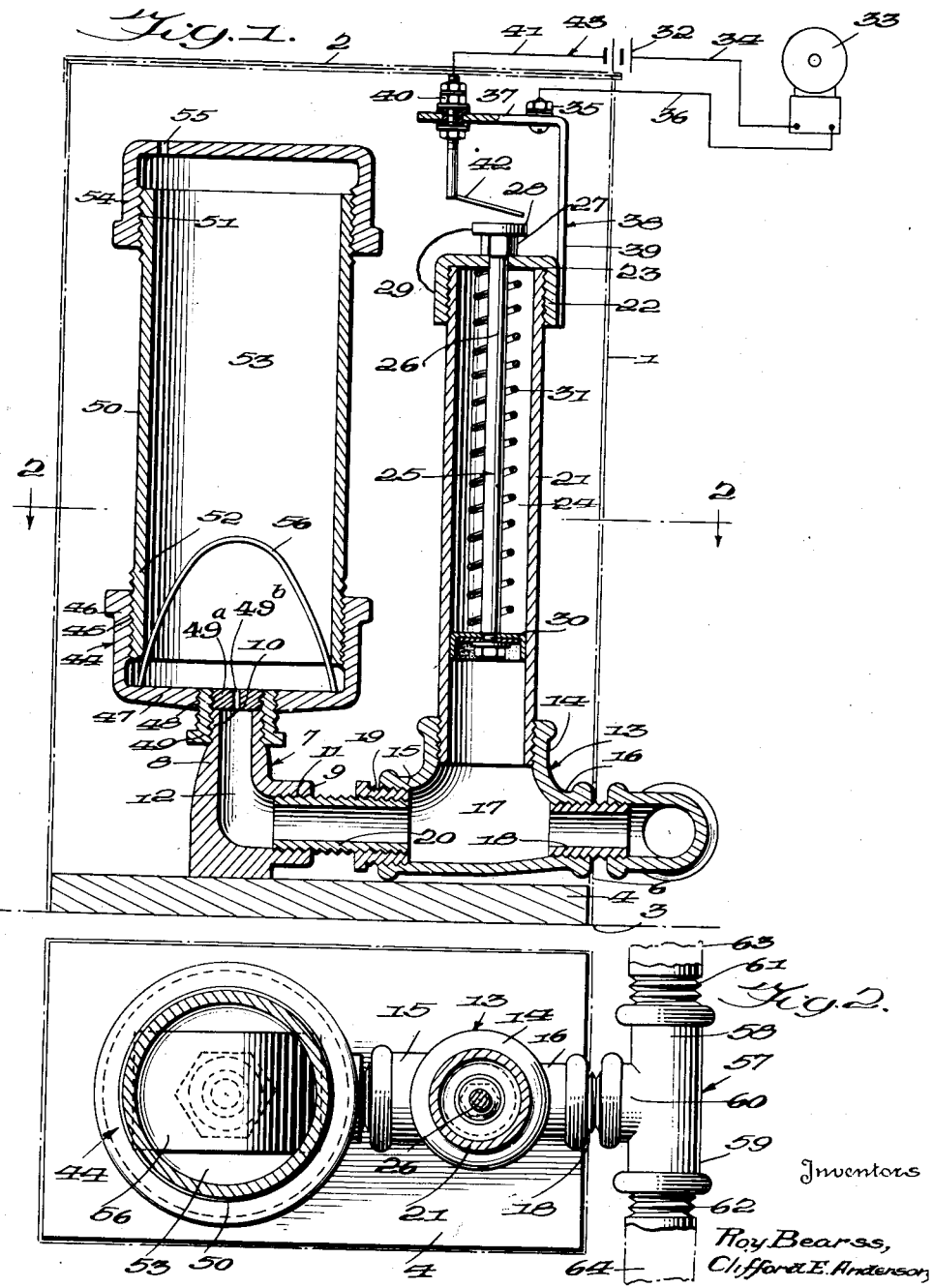

Inventors
Roy Bearss,
Clifford E. Anderson
By Kimmel & Crowell
Attorneys

Patented May 23, 1939

2,159,419

UNITED STATES PATENT OFFICE 2,159,419

ELECTRICAL SIGNAL OPERATING DEVICE

Roy Bearss and Clifford E. Anderson, Shelby, Mich.

Application November 7, 1936, Serial No. 109,790

4 Claims. (Cl. 200—82)

This invention relates to an electrical signal operating device designed primarily for use at service stations for automotive vehicles, but it is to be understood that the device, in accordance with this invention, is to be used in any connection for which it may be found applicable, and the invention has for its object to provide, in a manner as hereinafter set forth, a signal operating device, in the form of a unit interposed in an electrical signaling circuit and with the unit operated by a vehicle entering the station for the purpose of closing the circuit to operate the signal for giving notice to an attendant in charge of the station that one has entered the station who desired service.

A further object of the invention is to provide, in a manner as hereinafter set forth, an electrical signal operating device including means operated by hydraulic pressure for closing the circuit to make the signal active and with the hydraulic pressure produced by the travel of a vehicle wheel over a compressible liquid holder disposed in the path of travel of the vehicle.

A further object of the invention is to provide, in a manner as hereinafter set forth, a unit including means operated from hydraulic pressure for closing an electrical signaling circuit to make the signal active and with the unit including a part for relieving the pressure on said means immediately subsequent to the activity of the signal to render the later inactive.

Further objects of the invention are to provide in a manner as hereinafter set forth, an electrical signal operating device in the form of a unit which is simple in its construction and arrangement, strong, durable, compact, thoroughly efficient in its use, conveniently interposed in an electrical signaling circuit, readily assembled, and comparatively inexpensive to manufacture.

With the foregoing and other objects in view, the invention consists of the novel construction, combination and arrangement of parts as will be more specifically described and as are illustrated in the accompanying drawings wherein is shown an embodiment of the invention, but it is to be understood that changes, variations and modifications may be resorted to which fall within the scope of the invention as claimed.

In the drawings:

Figure 1 is a vertical sectional view of the unit interposed in an electrical signaling circuit, Figure 2 is a section on line 2—2, Figure 1.

Figure 3:
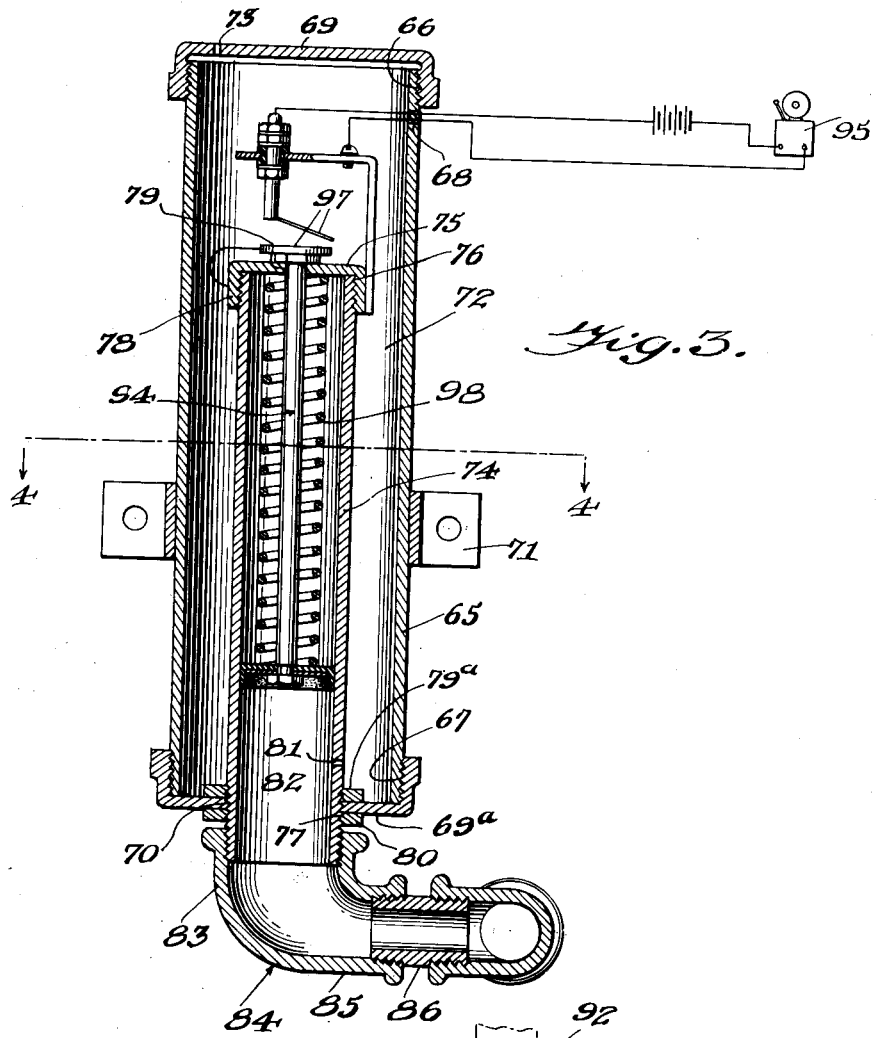
Figure 3 is a vertical sectional view of a modified form.

The device or unit includes a housing formed of any suitable durable material, preferably metal. The housing 1 includes a removable top 2. The housing is vertically disposed and of rectangular contour in plan. Arranged within the housing and suitably anchored to the bottom 3 is a base member 4 preferably constructed of wood. The front wall 5 of housing 1 in proximity to the base 4 is formed with an opening 6.

Suitably anchored to the base 4 is a tubular angle-shaped casting 7 formed of a vertical leg 8 and a horizontal leg 9. The periphery of the upper end of leg 8 is threaded as at 10. The inner face of the leg 9 is threaded as at 11. The leg 9 extends substantially at right angles to the lower end of the leg 8 and is spaced from and disposed parallel to the base 4. The lower end of the leg 8 is extended below the leg 9 and seats on base 4. The legs 8 and 9 coact to form an angle-shaped passage 12 having a vertical portion and a horizontal portion and with the latter arranged in the lower end of leg 8 and throughout the leg 9.

Arranged parallel to and spaced from the casting 7 is an upstanding inverted T-shaped hollow casting 13 formed of an interiorly threaded vertical leg 14 and a pair of oppositely extending interiorly threaded horizontally disposed legs 15, 16. The inner and outer diameters of the leg 15 are greater than the inner and outer diameters of the leg 16. The legs 14, 15 and 16 open into each other and coact to provide a chamber 17. The inner ends of the top of the legs 15, 16 merge into the lower end of the leg 14. The leg 16 has its inner face register with the edge of opening 6. Engaging with the inner face of the leg 16 for extending outwardly from the latter and beyond the front wall 5 is a tubular peripherally threaded coupling nipple 18. Engaging with the inner face of the leg 15 and extending rearwardly relative to casting 13 is an interiorly and exteriorly threaded flange coupling collar 19. Threadedly engaging at one of its ends with the threads 11 on the inner face of leg 9 and extending towards the leg 15 of the casting 13 is a peripherally threaded pipe 20 which is coupled with leg 15 by the collar 19. The leg 8 and pipe 20 provide a hydraulic pressure relief line. Threadedly engaging at its lower end with the leg 14 of casting 13 is a vertically disposed cylinder 21 which is open at each end and communicates at its lower end with the chamber 17. Threadedly engaging with the upper end of the periphery of the cylinder 21 is an interiorly threaded metallic cap member 22 having an axially arranged opening 23. The cylinder 21 provides a plunger chamber 24. Operating in the latter and extending through the opening 23 is a spring controlled plunger structure 25 consisting of a rod 26 formed at its upper end with a head 27 provided with a contact piece or circuit closer 28. The rod 26 and head 27 may or may not be formed of electrical conducting material. The contact piece 28 is electrically connected to the cap member 22 by a bonding wire 29. The lower end of the rod 26 carries a cup leather assembly 30 which slides against the inner face of the cylinder 24. Interposed between the assembly and the cap member 22 and surrounding the rod 26 is a coiled spring 31 normally tending to hold the contact piece 28 in lowered position. The cap member 22 and head 27 coact to slidably suspend the plunger structure in the cylinder 21. The plunger structure 25 is to be operated by hydraulic pressure against the action of the spring 31 for the purpose of shifting the contact piece 28 to be moved into engagement with a contact member to be referred to.

With reference to Figure 1, there is illustrated a signal formed with an alarm or bell interposed in a normally open signal operating circuit leading from a source of electrical supply and having interposed therein the cap member 22 and the contact piece 28. With reference to Figure 1, the source of electrical energy is indicated at 32, and the signal at 33. Leading from the source 32 to the signal 33 is a circuit conductor 34. Leading from the signal 33 to a binding post 35 is an electrical conductor 36. The post 35 is electrically connected to the horizontal arm 37 of an angle-shaped bracket 38. The latter includes a vertical arm 39 which has its lower end terminal portion secured to and electrically connected to the cap member 22. Carried by the arm 37 of the bracket 38 and insulated therefrom is a binding post 40 which extends above and depends from the arm 37. Leading from the source 32 to the post 40 is an electrical conductor 41. Connected to the lower end of the post 40 is the contact member heretofore referred to and which is indicated at 42. The member 42 extends downwardly at an inclination from its inner end and is resilient. The inner end of the member 42 is electrically connected to the lower end of the post 40. The contact member 42 is arranged in the path of the contact piece 28. From the construction shown, when the plunger structure 25 is elevated by hydraulic pressure, the contact piece 28 will engage the contact member 42 and close the signaling circuit 43 providing for the operation of the signal 33 as long as the contact piece 28 engages the contact member 42. When the plunger structure 25 is in the position shown in Figure 1, the contact piece 28 is clear of the contact member 42 whereby circuit 43 will be open.

Arranged above the casting 7 is a cup-shaped member 44 formed with internal threads 45 on the inner face of its body 46. The bottom of member 44 is indicated at 47 and is formed with an axial opening 48 having its wall threaded. The body 46 has its internal threads extend from the top and are spaced above the bottom thereof. Threadedly engaging with the wall of opening 48 and depending from the member 45 is an interiorly and exteriorly threaded flanged coupling collar 49 which engages with the threads 19 on the casting 7 for the purpose of coupling member 44 and casting 7 together. Secured within the upper end of collar 49 is a peripherally threaded disc 49ᵃ formed with an axially arranged port 49ᵇ preferably of one-sixteenth of an inch in diameter, but it is to be understood that the diameter of port 49ᵇ will be as desired. The diameter of port 49ᵇ is to be materially less than the inner diameters of collar 49 and casting 8.

Supported by the member 44 is a vertically disposed cylinder 50 formed of any suitable material and having its outer periphery near its upper end provided with threads 51 and near its lower end with threads 52. The threads 52 of the cylinder 50 engage with the internal threads of body 46 whereby member 44 and cylinder 50 are connected together. The lower end of cylinder 50 is spaced above the bottom 47 of member 44. The cylinder 50 is open at each end and communicates at its lower end with the interior of the member 44. The cylinder 50 provides an expansion chamber 53. Engaging with the threads 51 of the cylinder 50 is an internally threaded cap member 54 provided with a vent 55. The member 54 constitutes a closure for the upper end of the cylinder 50. Seated on the bottom 47 of member 44 and extending up into the chamber 53 is an inverted V-shaped resilient baffle 56.

Arranged exteriorly of the lower portion of the front wall 5 of housing 1, is a horizontally disposed T-shaped hollow casting or coupling 57 formed of a pair of oppositely disposed legs 58, 59 and a leg 60 which merges into the legs 58 and 59 at the inner ends of these latter. The legs 58, 59 are internally threaded for connecting therewith peripherally tubular coupling nipples 61, 62. The leg 60 is internally threaded for connecting it to the nipple 18. The nipples 61, 62 provide means for connecting with the legs 58, 59 compressible and extendible tubular holders 63, 64 for a liquid or fluid. The holders are closed at their outer ends and are provided with suitable means not shown for filling them. Each holder is termed a resilient hose and is of a length to be disposed on an approach to a service station and in the path of a vehicle entering the station whereby the hose will be compressed and create hydraulic pressure which is exerted upon the lower end of the plunger structure 25 whereby the latter will be forced upwardly to provide for the contact piece 28 engaging the contact member 42 to close the signaling circuit 43 to make active the signal 33.

Any excess pressure of the liquid or fluid is forced up into the expansion chamber 53 through the relief line formed by the elements heretofore referred to.

The expansion chamber 53 is kept about one-half full with liquid but there is always room above the stationary liquid or fluid for the excess liquid to be forced around the baffle 56 into the space above the stationary liquid or fluid. The baffle 56 prevents the excess liquid or fluid from being forced through the vent 55.

When the pressure of the liquid or fluid in the hose is exerted by reason of the vehicle wheels passing over it, the liquid or fluid is forced into the lower portion of the cylinder 21, thus causing the plunger structure 25 to rise in the chamber 24, so that electrical contact is established, thus making the signal active inside the station. The signal will be positioned in the station. The excess pressure of the liquid or fluid is spent by passing through the pipe 20, casting 7, and ported disc 49ᵃ into chamber 53 thus releasing the electrical contact about as soon as it would take for the length of an automobile to pass over the hose. As the front wheels of the vehicle pass over the hose it will cause one alarm to be rung and as the rear wheels of the vehicle pass over the hose there will be a second distinct and separate ring.

The space in the expansion chamber for the excess liquid or fluid to pass into provides that even though the automobile remains stationary upon the hole thus continuing the pressure upon the liquid, the pressure is removed by the absorption in the expansion chamber thus breaking the electric connection almost immediately and causing the bell or signal to become inactive.

It is to be understood that the expanding power of the spring 31 forces the plunger structure 25 downwardly so that the contact piece 28 will be shifted clear of contact member 42.

Figure 4:
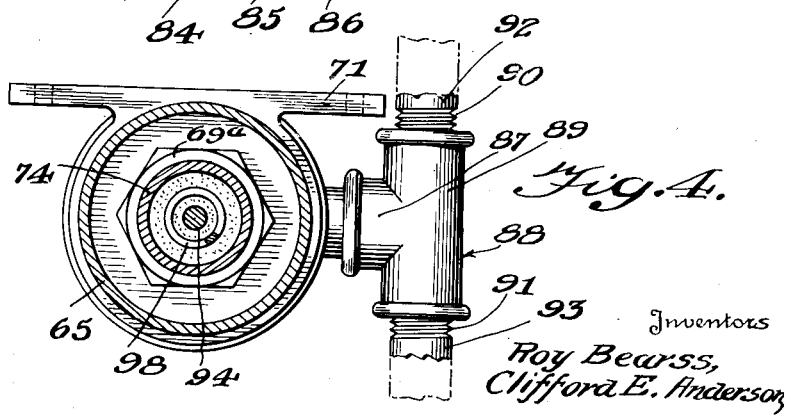
Figure 4 is a section on line 4—4 of Figure 3.

With reference to the modified form shown by Figures 3 and 4 it includes a vertically disposed cylinder 65 open at each end and having the outer periphery thereof at each end terminal portion, threaded as at 66, 67. The cylinder 65 in proximity to its upper end is formed with an opening 68 for a purpose to be referred to. A flanged interiorly threaded cap 69 detachably engages with the threads 66 for closing the upper end of cylinder 65. An internally threaded inverted flanged closure member 69a of cap-like form is detachably engaged with the threads 67 for closing the lower end of cylinder 65. The member 69a is formed with an opening 70 concentrically thereof. The wall of opening 70 is threaded. Secured to the cylinder 65 intermediate its ends is mounting bracket 71 therefor. The cylinder 65 provides a liquid expansion chamber 72. The cap 69 is formed with a vent opening 73.

Extending upwardly into the expansion chamber 72 through the opening 70 is a vertically disposed plunger structure cylinder 74 closed at its upper end by an axially apertured flanged head 75 and open at its lower end. The cylinder 74 is provided with threads on its outer periphery at its upper and lower ends as at 76, 77. The flange 78 of head 75 is internally threaded and engages with the threads 76 for securing head 75 in position. The aperture in head 75 is indicated at 79. The cylinder 74 is of less length than and has its outer diameter materially less than that of the inner diameter of cylinder 65. The threads 77 of cylinder 74 engage with the threads on the wall of opening 70. The cylinder 74 depends from the closure member 69 and coacting with the threads 77 and with the upper and lower faces of member 69 is a pair of superposed nuts 79a, 80 for anchoring the cylinders 65 and 74 together in spaced concentric relation. The cylinder 74 above and in proximity to nut 79a is ported, as at 81 to provide a by-pass between the plunger structure chamber 82, formed by cylinder 74 and the expansion chamber 72.

Attached to the lower end of cylinder 74, below the nut 80, is the vertical leg 83 of an elbow-shaped coupling 84. The horizontal leg 85 of coupling 84 is extended outwardly with respect to the lower end of leg 83. Secured with and projecting outwardly from leg 85 is a peripherally threaded tubular coupling sleeve 86 which extends into and threaded engages with the stem 87 of a T-shaped coupling 88. The head of coupling 88 is indicated at 89. Secured within and extending laterally in opposite directions with respect to the head 89 is a pair of peripherally threaded coupling nipples 90, 91 for connecting the head 89 oppositely disposed compressible and extendible tubular liquid or fluid holders 92, 93 closed at their outer ends. The holders 92, 93 are of the same form and for the same purpose as holders 63, 64.

Operating in the cylinder 74 is a spring controlled plunger structure 94 of substantially the same form and arrangement as that of the plunger structure shown in Figure 1.

The signal 95 and its normally open circuit 96, as well as the opening and closing means 97 for circuit 96 shown in Figures 3 and 4, are substantially of the same form as that shown in Figure 1 with this exception that the conductors of the circuit 96 extend into the cylinder 65 through opening 68. The latter is sealed after the passage of the circuit conductors therethrough.

In the form shown in Figures 3 and 4, the cylinder 65 provides a housing for the major portion of the cylinder 74 and the circuit opening and closing means 97.

The by-pass formed by the port 81 provides for the liquid or fluid entering chamber 82 shooting horizontally into the expansion chamber 72. The port 81 functions for the same purpose as opening or port 49b, casting 8 and pipe 20. The elbow 84 functions the same as coupling 13, that is to say, a lower liquid or fluid container or chamber, opening into the plunger chamber 82.

The normal approximate liquid level in chamber 72 will be as indicated by the dotted line 98, Figure 3.

In actual demonstrations of the structure, the result is a sharp, staccato ring which automatically ceases about as quickly as one would cause the ordinary door bell to cease ringing by releasing the electrical contact and as it is obvious from the structural arrangement shown, this result is accomplished by the alternate upward and downward movement of the plunger structure 25 and the automatic disposal of the excess liquid or fluid through the relief line into the expansion chamber.

What we claim is:

1. In a hydraulic pressure operated closing structure for an electric circuit and of that type including an expansion chamber into which extends the conductors of the circuit and an upstanding open top cylinder within and for communication with said chamber and a hydraulic pressure supply, the combination of an axially apertured cap of conducting material for closing the open top of the cylinder, a spring controlled hydraulic pressure operated piston structure for positioning within the cylinder, said structure extending through said cap and provided at its outer end with a head carrying a circuit closer electrically connected to said cap, an upstanding suspension of conducting material integral at its lower end with the cap, a terminal for one of said conductors electrically connected to said suspension, a resilient contact normally clear of and for engagement by said closer for closing the circuit on the operation of the piston structure by hydraulic pressure, and a terminal for the other conductor of the circuit carried by and insulated from said suspension and having attached thereto said contact.

2. In a hydraulic pressure operated closing structure for an electric circuit, an upstanding annular structure providing an expansion chamber, said structure being formed at its upper portion with a vent for said chamber and an opening for the passage into the chamber of the conductors of the circuit, said annular structure having its bottom formed with an opening, an upstanding open top and open bottom cylinder arranged within said chamber, extending through the opening in and depending from said bottom, means for securing said cylinder to said bottom, said cylinder being formed with an opening above and in proximity to said bottom for establishing communication between it and said chamber, means for establishing communication between the lower end of the cylinder and a hydraulic pressure supply, an apertured cap of conducting material for closing the top of the cylinder, a spring controlled hydraulic pressure operated plunger structure operating in said cylinder and having a part extending through said cap, a circuit closing means within said chamber, normally in inactive position and made active on the operation of said piston structure by hydraulic pressure, said circuit closing means including a contact spaced from the outer end of said part and a circuit closer on the outer end of said part for coaction with said contact to close the circuit, said contact being electrically connected to one of said conductors, said closer being electrically connected to said cap, and said cap being electrically connected to the other of said conductors.

3. In a hydraulic pressure operated closing structure for an electric circuit, a cylinder for communication at its lower end with a source of hydraulic pressure and provided at its other end with a closer cap of conducting material formed with an axial opening, an arm of conducting material integral with and electrically connected to said cap, a pair of spaced terminals for a pair of conductors of the circuit, said terminals being carried by said arm, one of said terminals being electrically connected to and the other insulated from said arm, a resilient contact carried by the said other terminal, a spring controlled hydraulic pressure operated piston structure operating in said cylinder and having a part extending through the opening in said cap, a circuit closer on the outer end of said part for coaction with said contact to close the circuit on the operation of said piston structure by hydraulic pressure, and means for electrically connecting said closer to said cap.

4. In a hydraulic pressure operated circuit closing structure, an upstanding structure providing an expansion chamber, said upstanding structure being formed with a vent for said chamber and a passage extending therethrough into the chamber, a pair of spaced circuit conductors extending through said passage, said upstanding structure being formed in its bottom with an opening, a closed top and open bottom hydraulic pressure receiving cylinder arranged within said chamber, depending through the opening in said bottom, connected to said bottom and being ported for establishing communication between the interior thereof and said chamber, terminals within said chamber for said conductors, said terminals being insulated from each other, a contact depending from one of said terminals, a spring controlled hydraulic pressure operated piston structure operating in said cylinder and having a part slidably extending through the top of said cylinder, a circuit closer carried by the outer end of said part and coacting with said contact for closing the circuit when the piston structure is operated by hydraulic pressure, the closed top of said cylinder being in the form of an apertured cap of conducting material, said closer being electrically connected to said cap, and that terminal not provided with the contact being electrically connected to said cap.

ROY BEARSS.
CLIFFORD E. ANDERSON.